US010668787B2

(12) United States Patent
Lee et al.

(10) Patent No.: US 10,668,787 B2
(45) Date of Patent: Jun. 2, 2020

(54) APPARATUS FOR ADJUSTING DIRECTION OF AIR FLOW OF SLIM TYPE AIR VENT FOR AUTOMOTIVE VEHICLE

(71) Applicants:Hyundai Motor Company, Seoul (KR); NIFCO KOREA Inc., Asan-si (KR); Hyundai Mobis Co., Ltd., Seoul (KR)

(72) Inventors: Young Ju Lee, Suwon-si (KR); In Seop Kim, Uiwang-si (KR); Young Rok Lee, Hwaseong-si (KR); Young Beom Lee, Bucheon-si (KR); Choong Yeul Kim, Suwon-si (KR); Dae Ig Jung, Suwon-si (KR); Keun Sig Lim, Yongin-si (KR); Ji Won Lee, Cheonan-si (KR); Jae Seob Choi, Yongin-si (KR); Won Sik Kim, Yongin-si (KR)

(73) Assignees: Hyundai Motor Company, Seoul (KR); NIFCO KOREA Inc., Asan-si (KR); Hyundai Mobis Co., Ltd., Seoul (KR)

( * ) Notice: Subject to any disclaimer, the term of this patent is extended or adjusted under 35 U.S.C. 154(b) by 359 days.

(21) Appl. No.: 15/498,262

(22) Filed: Apr. 26, 2017

(65) Prior Publication Data
US 2018/0170152 A1 Jun. 21, 2018

(30) Foreign Application Priority Data
Dec. 21, 2016 (KR) .......................... 10-2016-0175489

(51) Int. Cl.
*B60H 1/34* (2006.01)
*B60K 37/06* (2006.01)
(52) U.S. Cl.
CPC ................................ *B60H 1/3421* (2013.01)
(58) Field of Classification Search
CPC ...... B60H 1/3421; B60H 1/34; B60H 1/3471; B60H 1/345; B60H 1/3428; B60H 1/3435; B60H 1/3414; B60H 1/00842
(Continued)

(56) References Cited

U.S. PATENT DOCUMENTS 6,394,891 B1 * 5/2002 Arold .................... B60H 1/3414
454/155
6,808,451 B2 * 10/2004 Luik ..................... B60H 1/3421
454/155
(Continued)

*Primary Examiner* — Steven S Anderson, II
(74) *Attorney, Agent, or Firm* — Morgan, Lewis & Bockius LLP

(57) ABSTRACT

An apparatus for adjusting direction of air flow of a slim type air vent for an automotive vehicle may include a nozzle type wing that can rotate angularly upwards or downwards and be mounted inside the air vent having slim structure and a gear for rotating the nozzle type wing upwards or downwards is formed on a single transverse wing exposed to the outside such that manipulation force for rotating the single transverse wing angularly upwards or downwards can be transmitted to the nozzle type wing through the gear to rotate the nozzle type wing angularly upwards or downwards and hence the upward or downward direction of air flow being discharged into a cabin can be easily adjusted by upward or downward angular and rotational operation of the nozzle type wing.

10 Claims, 7 Drawing Sheets

(58) Field of Classification Search
USPC .......................................................... 454/155
See application file for complete search history.

(56) References Cited

U.S. PATENT DOCUMENTS

| | | | | |
|---|---|---|---|---|
| 6,941,967 B2* | 9/2005 | Butera | ............... | B60H 1/00842 137/351 |
| 7,604,533 B2* | 10/2009 | Ogura | .................. | B60H 1/3421 454/143 |
| 2003/0050001 A1* | 3/2003 | Kamio | .................. | B60H 1/345 454/155 |
| 2003/0157880 A1* | 8/2003 | Nishida | ................ | B60H 1/3414 454/155 |
| 2004/0072532 A1* | 4/2004 | Cho | ..................... | B60H 1/3414 454/155 |
| 2004/0072533 A1* | 4/2004 | Cho | ..................... | B60H 1/3414 454/155 |
| 2005/0176364 A1* | 8/2005 | Gehring | ............... | B60H 1/3414 454/155 |
| 2005/0239391 A1* | 10/2005 | Shibata | ................ | B60H 1/3421 454/155 |
| 2007/0111653 A1* | 5/2007 | Endou | .................. | B60H 1/3421 454/155 |
| 2007/0232216 A1* | 10/2007 | Shibata | ................ | B60H 1/3421 454/155 |
| 2008/0146139 A1* | 6/2008 | Terai | .................... | B60H 1/3421 454/155 |
| 2010/0261422 A1* | 10/2010 | Sakakibara | .......... | B60H 1/3414 454/155 |
| 2012/0060776 A1* | 3/2012 | Charnesky | ........... | B60K 11/085 123/41.05 |
| 2013/0252531 A1* | 9/2013 | Asano | .................. | B60K 11/085 454/155 |
| 2014/0120823 A1* | 5/2014 | Brinas | ..................... | B60H 1/34 454/155 |
| 2015/0004897 A1* | 1/2015 | Ishikawa | ............... | B60H 1/3421 454/155 |

* cited by examiner

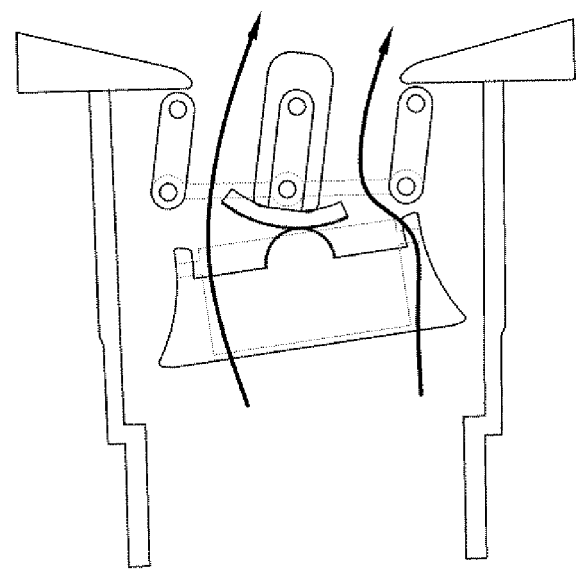
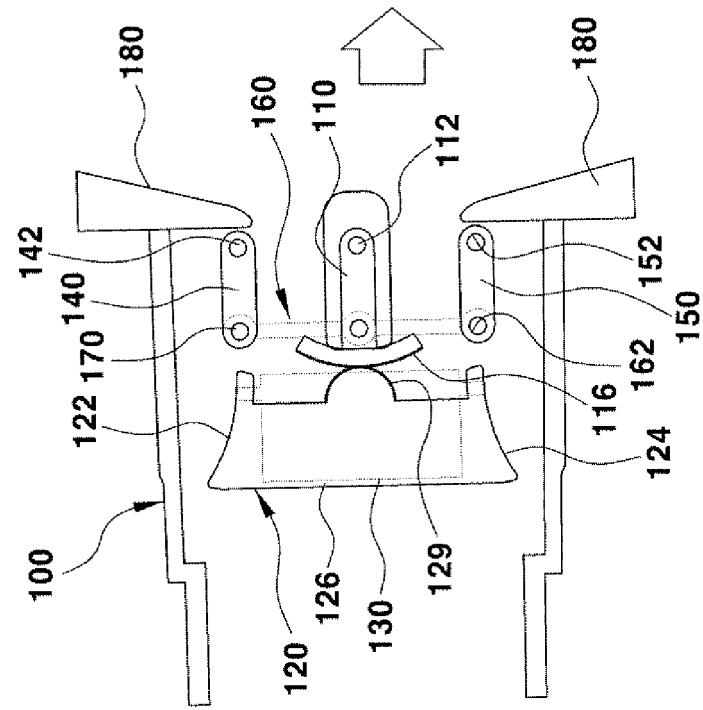
FIG. 8

APPARATUS FOR ADJUSTING DIRECTION OF AIR FLOW OF SLIM TYPE AIR VENT FOR AUTOMOTIVE VEHICLE

CROSS-REFERENCE(S) TO RELATED APPLICATIONS

The present application claims priority to Korean Patent Application No. 10-2016-0175489 filed on Dec. 21, 2016, the entire contents of which are incorporated herein for all purposes by this reference.

BACKGROUND OF THE INVENTION

Field of the Invention

The present invention relates to an apparatus for adjusting direction of air flow of a slim type air vent for an automotive vehicle, and more particularly, to an apparatus for adjusting direction of air flow of a slim type air vent for an automotive vehicle, in which a nozzle type wing is mounted inside an air duct of the slim type air vent and upward and downward discharge directions of air flow can be easily adjusted accordingly.

Description of Related Art

As the size of a cluster and an audio, video and navigator (AVN) system which are disposed in a cabin of an automotive vehicle is increased, there is a trend to shift the mounted position of an air vent discharging air according to operation of an air conditioner (cooler and heater) to a lower region of a center fascia panel and particularly there is a trend to design external appearance of the air vent into a slim type.

Typically, the air vent includes a center air vent mounted in a center fascia panel between front faces of a driver seat and a passenger seat, side vents mounted in the crash pad at the front faces of the driver seat and passenger seat, and the like.

FIG. 1 of the accompanying drawings shows an external appearance of a center air vent out of conventional air vents.

As shown in FIG. 1, a plurality of transverse wings 11 and a plurality of vertical wings 12 are rotatably mounted at an outlet of an air duct 10, wherein one of the plurality of transverse wings 11 is provided with a wind direction adjusting knob 13 for adjusting an up and down angle of the transverse wings 11 and a left and right angle of the vertical wings 12 and a knob for adjusting a damper 14 is rotatably mounted by the side of the outlet of the air duct 10.

This conventional air vent is constructed with a wide vertical width as at least five transverse wings and at least six vertical wings are employed therein. Therefore, although there is no problem in that the direction of the air flow being discharged into a cabin can be easily adjusted to direct toward the occupant's body (e.g., lower part of the body: belly button, upper part of the body: face), there are disadvantages in that size of the air vent is large enough to cause problems in packaging with other components around the air vent; and there are many constraints on a design.

Furthermore, since the conventional air vent as mentioned above has a structure that the plurality of transverse wings and vertical wings are inevitably exposed because of their external appearance, it occupies a large installation space in a center fascia panel or a crash pad, leading to a decrease in degrees of design freedom of the cluster and AVN system disposed around the air vent.

Therefore, to enhance the degree of the design freedom of the cluster and AVN system, a slim type air vent, in which only a single transverse wing is exposed to the outside, has been applied.

Since the slim type air vent has a slim air duct of which the horizontal length is longer and the vertical height is shorter than those of the conventional air vent, it is advantageous in that it does not occupy a large installation area and hence the degree of the design freedom of the peripheral components (e.g., cluster, AVN system, etc.) is enhanced, but it is disadvantageous in that since only the single transverse wing is mounted to be exposed to the outside at an outlet position of the slim type air duct, the direction of air flow being discharged into the cabin cannot be easily adjusted to direct upwards or downwards.

The information disclosed in this Background of the Invention section is only for enhancement of understanding of the background of the invention and should not be taken as an acknowledgement or any form of suggestion that this information forms the related art already known to a person skill in the art.

BRIEF SUMMARY

Various aspects of the present invention are directed to providing an apparatus for adjusting direction of air flow of a slim type air vent for an automotive vehicle, in which a nozzle type wing that can rotate angularly upwards or downwards is mounted inside the air vent having slim structure and gears for rotating the nozzle type wing upwards or downwards are formed on a single transverse wing exposed to the outside, wherein a manipulation force for rotating the single transverse wing angularly upwards or downwards can be transmitted to the nozzle type wing through the gears to rotate the nozzle type wing angularly upwards or downwards and hence the upward or downward direction of the air flow being discharged into a cabin can be easily adjusted by upward or downward angular and rotational operation of the nozzle type wing.

Various aspects of the present invention are directed to providing an apparatus for adjusting the direction of air flow of a slim type air vent for an automotive vehicle including a single transverse wing mounted to an outlet of a slim air duct in a manner of rotating angularly upwards or downwards to guide direction of air flow being discharged into a cabin upwards or downwards; driving gears formed on a back surface of the single transverse wing; a nozzle type wing mounted inside the slim air duct in a manner of rotating angularly upwards or downwards to guide the direction of the air flow being discharged into the cabin upwards or downwards; and driven gears formed on front surfaces of both end portions of the nozzle type wing to engage with the driving gears.

The nozzle type wing is formed in a rectangular frame shape in which a top plate inclined downwards and bottom plates inclined upwards which are inclined downward and upward toward the cabin respectively are integrally connected by both side plates.

Further, hinge end portions hinged to an internal wall surface of the slim air duct are integrally formed as a center point of angular rotation of the nozzle type wing at front end portions of the both side plates and the driven gears are integrally formed on front surfaces of the hinge end portions.

A plurality of vertical wings for guiding straight flow of air flow are disposed at a constant interval in the nozzle type wing.

Further, the driving gears of the single transverse wing are formed in an arched arcuate cross-sectional structure and the driven gears of the nozzle type wing are formed in a semicircular cross-sectional structure.

Further, first hinge pins hinged to the internal wall surface of the outlet of the slim air duct are integrally formed as a center point of angular rotation of the single transverse wing at front positions of the both sides of the single transverse wing.

Preferably, upper and lower transverse wings for guiding the upward and downward discharging direction of air flow are further disposed respectively in a manner of rotating angularly at upper and lower positions from the single transverse wing, the upper position and the lower position being which are separated apart from the single transverse wing respectively each other; and second and third hinge pins which are hinged to the internal wall surface of the outlet of the slim air duct are integrally formed at the front positions of the both sides of the upper and lower transverse wings respectively.

Guide pins are formed integrally at rear positions of both sides of the single transverse wing and rear positions of both sides of the upper and lower transverse wings, wherein each guide pin is hinged to a vertical link for converting direction and wherein the vertical link for converting direction is provided as a straight link in which engaging grooves to which the guide pins are hinged are formed vertically and equidistantly to force the upper and lower transverse wings to rotate angularly in the same direction while the vertical link for converting direction moves linearly in an upward or downward direction when the single transverse wing rotates angularly in the upward or downward direction.

With the above-mentioned means for solving the problems of the prior art, various aspects of the present invention are directed to providing the following effects.

First, since the nozzle type wing mounted in the air vent is rotated angularly upwards or downwards by manipulation force that forces the single transverse wing mounted in the outlet of the air vent having slim structure to rotate angularly upwards or downwards, the upward or downward direction of air flow being discharged into the cabin can be easily adjusted by an upward or downward angular and rotational operation of the nozzle type wing.

Second, since the upper and lower transverse wings for guiding the upward and downward discharging direction of air flow are further disposed respectively at the upper and lower positions from the single transverse wing, which are separated apart from the single transverse wing respectively, the upward or downward direction of air flow being discharged into the cabin can be more easily adjusted by the upper and lower transverse wings.

Third, since a plurality of vertical wings are mounted inside the nozzle type wing, it is possible to ensure the straightness of air flow being discharged into the cabin.

Various aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 and FIG. 8 are cross-section views showing an operation state of a slim type air vent apparatus for an automotive vehicle according to an exemplary embodiment of the present invention.

Figure 1:
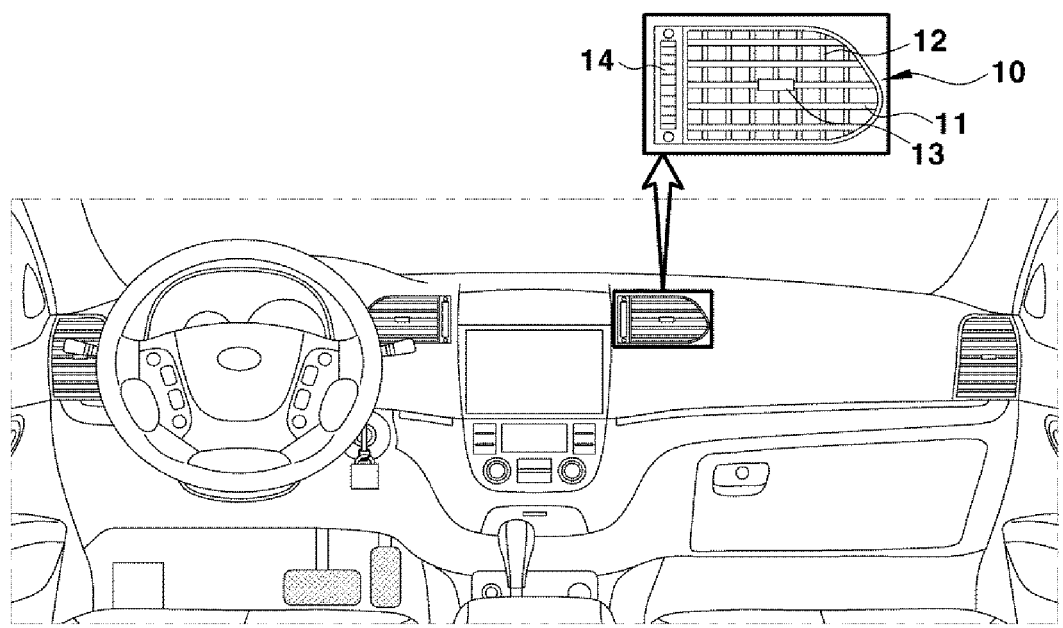
FIG. 1 is a schematic view illustrating arrangement structure of a conventional air vent.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings.

Figure 2:
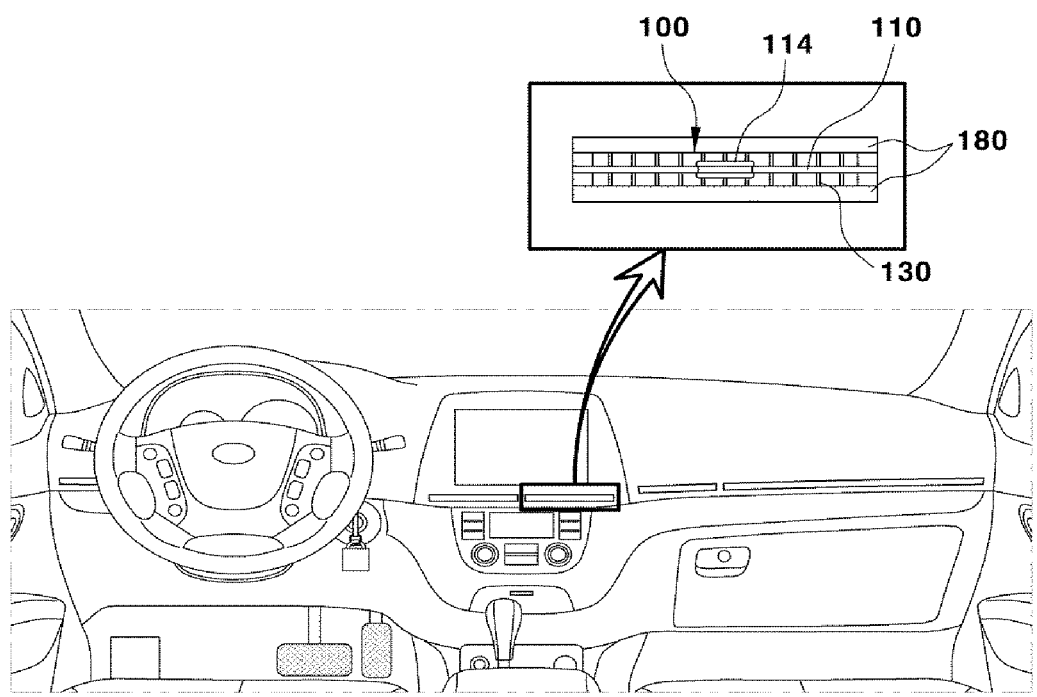
FIG. 2 is a schematic view illustrating external appearance of a slim type air vent apparatus for an automotive vehicle according to exemplary embodiment of the present invention.
Figure 3:
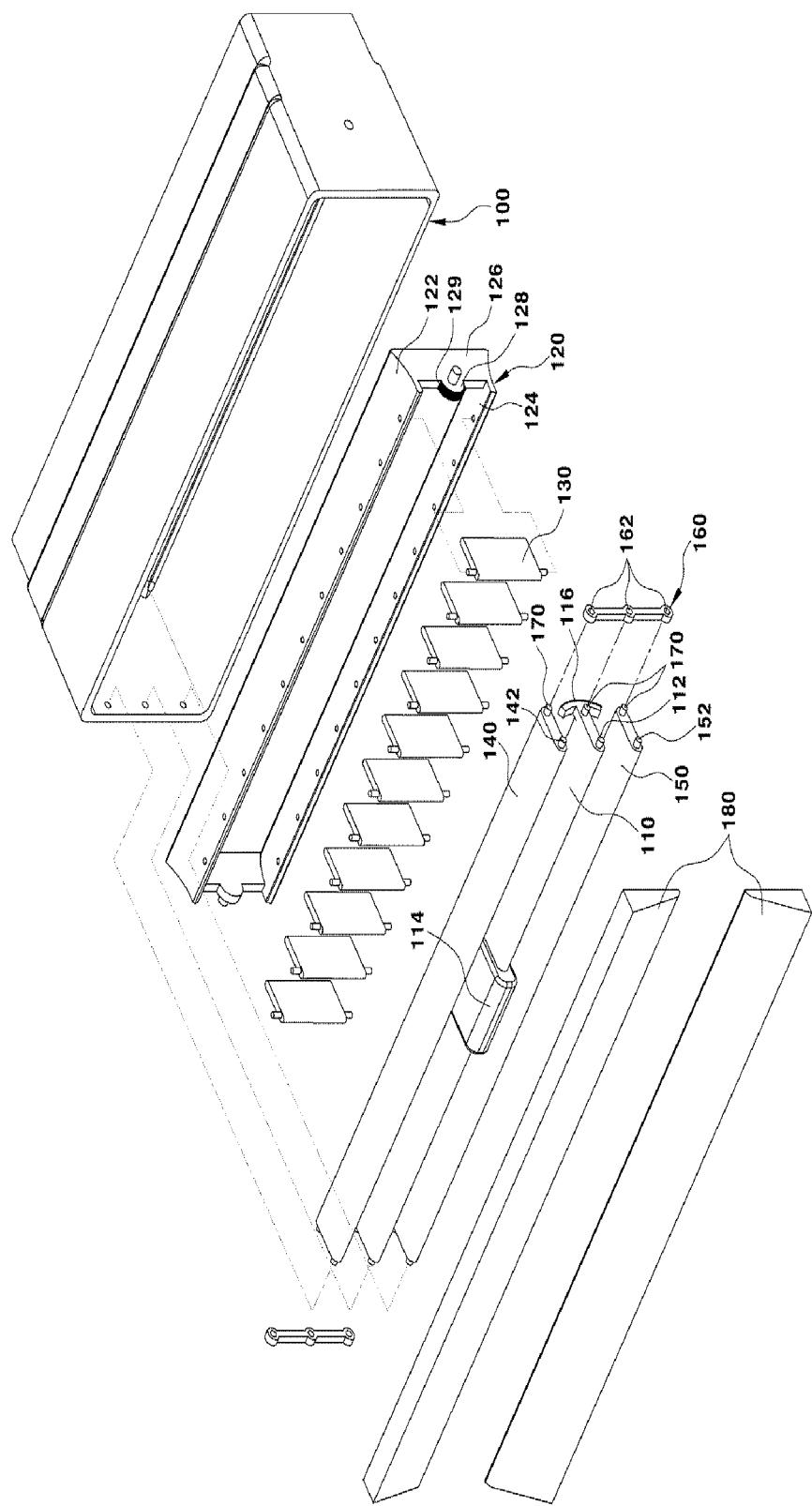
FIG. 3 is an exploded perspective view illustrating an apparatus for adjusting direction of air flow of a slim type air vent for an automotive vehicle according to an exemplary embodiment of the present invention.

FIG. 2 of the accompanying drawings is a schematic view illustrating the external appearance of a slim type air vent apparatus for an automotive vehicle according to an exemplary embodiment of the present invention. As seen from the figure, only a single transverse wing 110 is exposed to the outside at a position of an outlet of a slim air duct 100.

Since the slim air duct 100 has a structure of which the horizontal length thereof is longer and the vertical height thereof is lower compared with those of a conventional air vent respectively, it is possible to secure a larger installation section for a cluster, an AVN system and the like which are mounted in a center fascia panel, a crash pad, etc. compared with the related art and improve design degree of freedom of the cluster, AVN system and the like.

Further, since only the single transverse wing 110 is mounted in a manner of rotating angularly upwards or downwards in the slim air duct 100, the slim air duct 100 looks aesthetically simple.

A main aspect of the present invention is to allow the upward or downward direction of air flow being discharged into a cabin to be easily adjusted by upward or downward angular and rotational operation of the nozzle type wing by mounting a nozzle type wing that can rotate angularly upwards or downwards inside the slim air duct and forming gears for rotating the nozzle type wing upwards or downwards on the single transverse wing exposed to the outside, wherein a manipulation force for rotating the single transverse wing angularly upwards or downwards can be transmitted to the nozzle type wing through the gear to rotate the nozzle type wing angularly upwards or downwards.

FIG. 3 to FIG. 6 of the accompanying drawings are views depicting construction of a slim type air vent apparatus for an automotive vehicle according to an exemplary embodiment of the present invention, wherein reference numeral 100 denotes a slim air duct.

The single transverse wing 110 is hinged in a manner of rotating angularly upwards or downwards to a position of an outlet of the slim air duct 100, preferably a center fascia panel or a crash pad corresponding to the position of the outlet of the slim air duct 100 so that direction of air flow being discharged into a cabin can be adjusted upwards or downwards.

To this end, first hinge pins 112 hinged to the internal wall surface of the outlet of the slim air duct 100 are integrally formed as a center point of angular rotation of the single transverse wing 110 at front positions of the both sides of the single transverse wing 110.

Further, a knob 114 is mounted at a central position of the single transverse wing 110 as a device for rotating angularly the single transverse wing 110 upwards or downwards.

Accordingly, upon holding the knob 114 and rotating angularly the single transverse wing 110 upwards or downwards, a rear end portion of the single transverse wing 110 rotates angularly upwards or downwards about the first hinge pins 112.

Driving gears 116 for transmitting angular and rotational force to the nozzle type wing are integrally formed at opposite end portions of a back surface of the single transverse wing 110 respectively wherein each of the driving gears 116 is formed in an arched arcuate cross-section structure, not rather than a circular structure, in consideration of the maximum range of upward and downward angular rotation of the single transverse wing 110.

A nozzle type wing 120 is mounted in a manner of rotating angularly upwards or downwards in the inside of the slim air duct 100 and is configured to guide the direction of air flow being discharged into the cabin upwards or downwards, wherein it is manufactured and provided in a rectangular frame shape in which a top plate 122 inclined downward toward the cabin and a bottom plate 124 inclined upwards toward the cabin are connected integrally by both side plates 126.

The nozzle type wing 120 also is configured to increase speed of the air flow being discharged into the cabin instantaneously and hence discharge the air flow concentrically into the cabin by the top plate 122 inclined downward toward the cabin and the bottom plate 124 inclined upwards toward the cabin.

Hinge end portions 128 hinged to an internal wall surface of the slim air duct 100 are integrally formed as a center point of angular rotation of the nozzle type wing 120 at front end portions of the both side plates 126 and driven gears 129 to be engaged with the driving gears 116 of the single transverse wing 110 are integrally formed on front surfaces of the hinge end portions 128.

In the present case, the driven gears 129 of the nozzle type wing 120 are formed in a semicircular cross-section structure, rather than a circular structure, together with the hinge end portions 128 in consideration of the maximum range of upward and downward angular rotation of the nozzle type wing 120.

Accordingly, upon holding the knob 114 and rotating angularly the single transverse wing 110 upwards or downwards, the driving gears 116 of the single transverse wing 110 also rotate angularly to transmit angular and rotational force to the driven gears 129 and subsequently the nozzle type wing 120 is rotated angularly upwards or downwards about the hinge end portions 128 by angular rotation of the driven gears 129, so that the direction in which the air flow passing through the nozzle type wing 120 is discharged into the cabin is adjusted upwards or downwards.

On the other hand, upper and lower transverse wings 140 and 150, respectively, which are provided in the same shape as the single transverse wing 110 to guide the upward and downward discharging direction of the air flow are further disposed respectively in a manner of rotating angularly at upper and lower positions from the single transverse wing 110, which are separated apart from the single transverse wing respectively.

Second hinge pins 142 and third hinge pins 152 are integrally formed at front positions of both sides of the upper transverse wing 140 and the lower transverse wing 150 respectively and the second hinge pins 142 and the third hinge pins 152 are hinged to the internal wall surface of the outlet of the slim air duct 100, with the result that the upper transverse wing 140 and the lower transverse wing 150 can rotate angularly upwards or downwards.

In the present case, the upper transverse wing 140 and the lower transverse wing 150 as well as the single vertical wing 110 are connected as one by a vertical link 160 for converting direction, wherein when the single transverse wing 110 rotates angularly, the upper transverse wing 140 and the lower transverse wing 150 can also simultaneously rotate angularly at the same angle.

To this end, the vertical link 160 for converting direction is provided as a straight link in which fastening grooves 162 are formed at an equal interval in a vertical direction thereof, while guide pins 170 hinged to fastening grooves 162 of the vertical link 160 for converting direction are integrally formed at rear positions of both sides of the single transverse wing 110 and rear positions of both sides of the upper transverse wing 140 and the lower transverse wing 150.

Accordingly, upon holding the knob 114 and rotating angularly the single transverse wing 110 upwards or downwards, a rear end portion of the single transverse wing 110 rotates angularly upwards or downwards about the first hinge pins 112, with the result that the upper transverse wing 140 and the lower transverse wing 150 also rotate angularly at the same angle in the same direction, guiding the direction of the air flow discharging toward the cabin upwards or downwards.

When the rear end portion of the single transverse wing 110 rotates angularly upwards or downwards about the first hinge pins 112, the vertical link 160 for converting direction simultaneously performs a straight movement upwards or downwards and subsequently an upward or downward straight movement of the vertical link 160 causes the upper transverse wing 140 to rotate angularly upwards or downwards about the second hinge pins 142 and also causes the lower transverse wing 150 to rotate angularly upwards or downwards about the third hinge pins 152, with the result that the upper transverse wing 140 and the lower transverse wing 150 together with the single transverse wing 110 guide the air flow discharging toward the cabin upwards or downwards.

Figure 4:
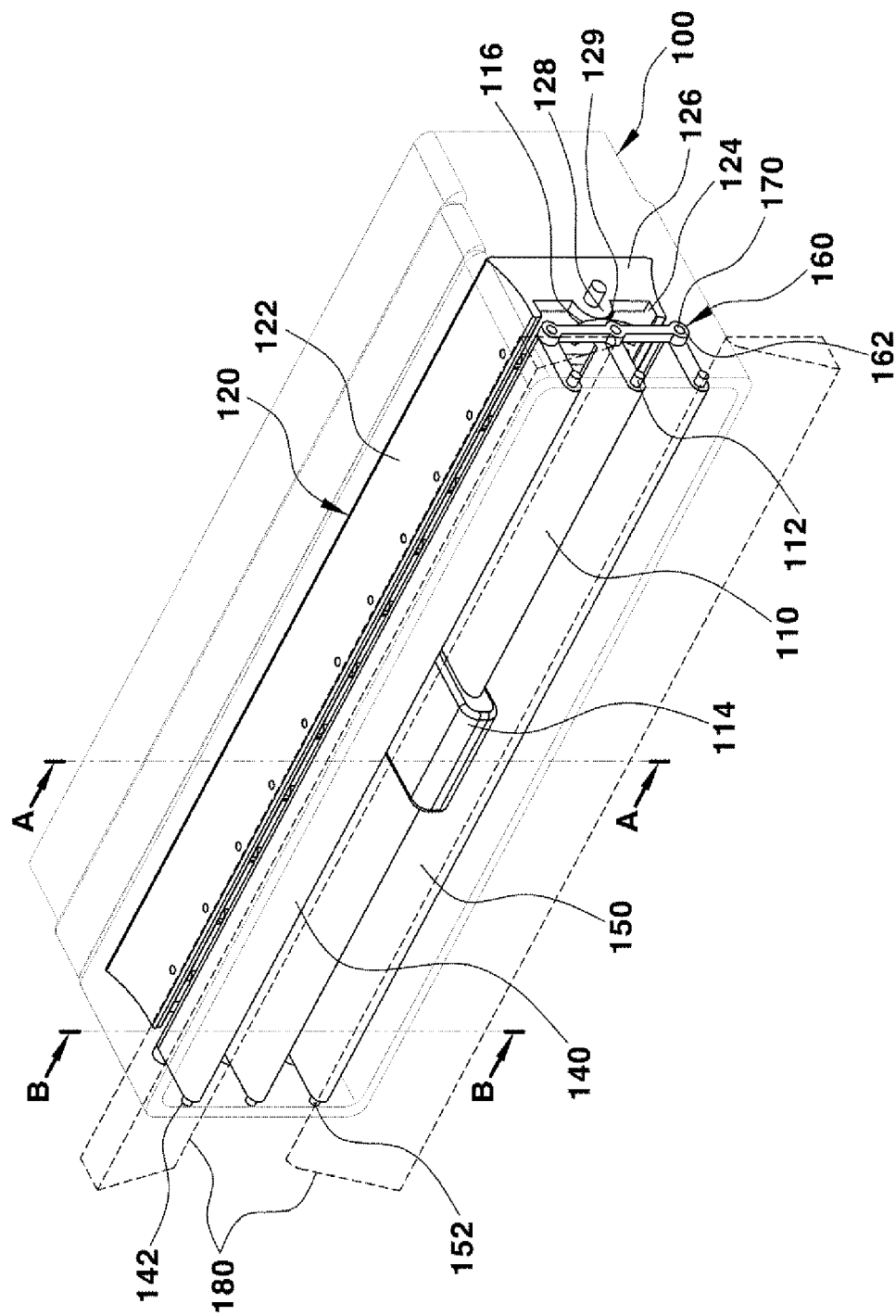
FIG. 4 is an assembled perspective view illustrating a slim type air vent apparatus for an automotive vehicle according to an exemplary embodiment of the present invention.
Figure 5:
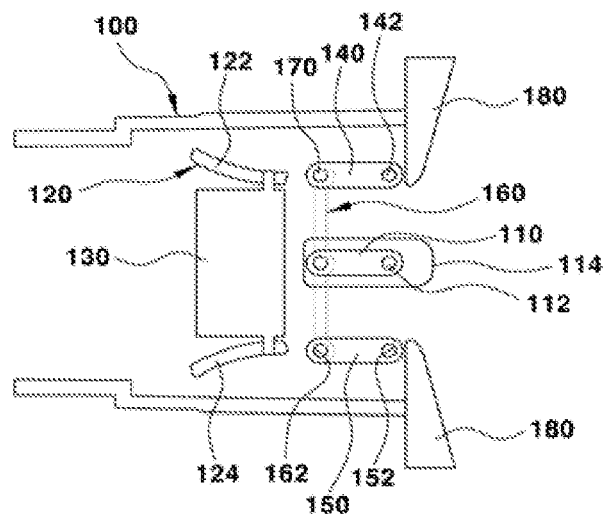
FIG. 5 is a cross-section view of a slim type air vent apparatus for an automotive vehicle according to an exemplary embodiment of the present invention, taken along line A-A of FIG. 4.
Figure 6:
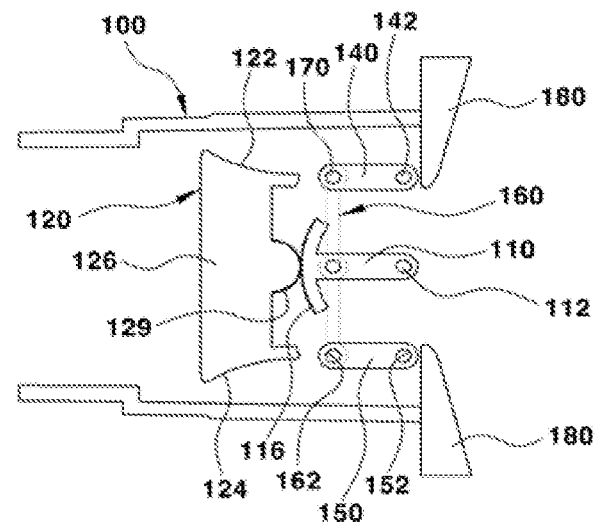
FIG. 6 is a cross-section view of a slim type air vent apparatus for an automotive vehicle according to an exemplary embodiment of the present invention, taken along line B-B of FIG. 4.

In this regard, referring to FIG. 2 and FIG. 4, the upper and lower transverse wings 140 and 150 respectively are not visible when viewed from the outside because the upper and lower outlet portions of the slim air vent 100 are concealed by garnishes 180 (a type of decorative plate mounted on the crash pad along the outline of the slim air vent).

Therefore, only the single transverse wing 110 is exposed to the outside so that the slim air vent 100 looks aesthetically simple.

On the other hand, a plurality of vertical wings 130 for guiding the straight flow of air flow are disposed at a constant interval in the nozzle type wing 120.

The upper end portions and the lower end portions of the vertical wings 130 are fixed to the bottom surface of the top plate 122 and the top surface of the bottom plate 124 of the nozzle type wing 120 respectively so that the vertical wings 130 are disposed at a constant interval along the left and right direction inside the nozzle type wing 120 to impart straightness to the air flow passing through the nozzle type wing 120.

Operational flow of the apparatus for adjusting direction of air flow of a slim air vent according to an exemplary embodiment of the present invention, which is configured as discussed above, is now described below.

Figure 7:
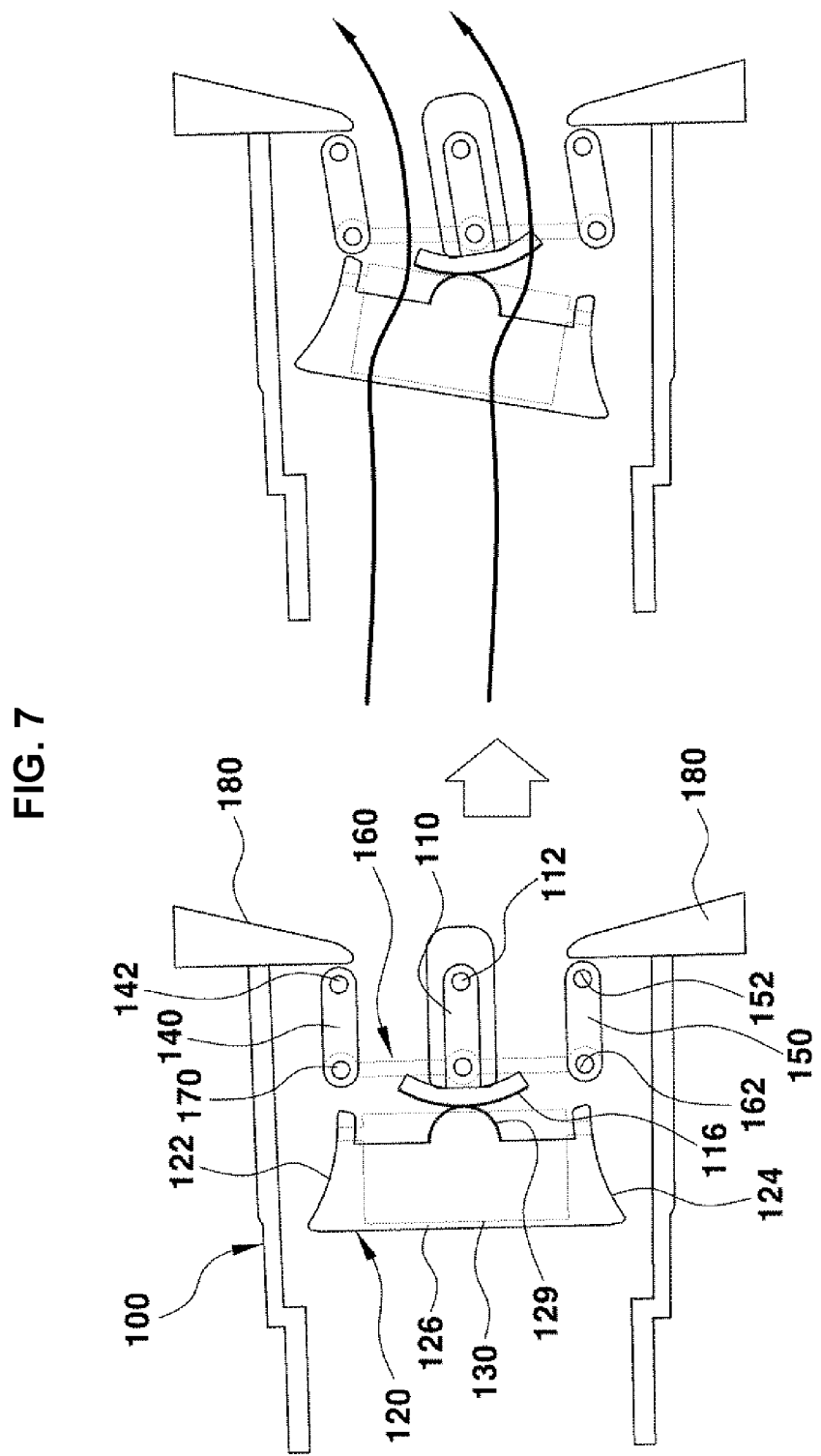

FIG. 7 is a cross-section view showing operation conditions of a slim type air vent apparatus for an automotive vehicle according to an exemplary embodiment of the present invention.

Operation of Discharging Air Flow Upward into a Cabin Will be Described Infra.

First, when a user holds the knob 114 mounted to the single transverse wing 110 and rotates angularly the single transverse wing 110 downwards, the rear end portion of the single transverse wing 110 rotates angularly downwards about the first hinge pins 112.

Accordingly, as shown in FIG. 7, the single transverse wing 110 is disposed to be inclined upwards from the rear end portion toward the front end portion.

Then, the driving gears 116 of the single transverse wing 110 also rotate angularly to transmit angular and rotational force to the driven gears 129 and subsequently the nozzle type wing 120 is rotated angularly downward about the hinge end portions 128 by angular rotation of the driven gears 129, so that the direction in which the air flow passing through the nozzle type wing 120 is discharged into the cabin is adjusted slightly downward as can be seen in FIG. 7.

At the present time, since the upper and lower transverse wings 140 and 150 respectively as well as the single transverse wing 110 are connected as one by the vertical link 160 for converting direction as described above, the vertical link 160 for converting direction moves linearly downward when the single transverse wing 110 rotates angularly downward.

Subsequently, the rear end portion of the upper transverse wing 140 is rotated angularly downward about the second hinge pins 142 at the front end and the rear end portion of the lower transverse wing 150 is also rotated angularly downward about the third hinge pins 152 at the front end by downward linear movement of the vertical link 160 for converting direction, with the result that the upper and lower transverse wings 140 and 150 together with the single transverse wing 110 are disposed to be inclined upwards from the rear end portion toward the front end which is the cabin side to guide direction of the air flow being discharged into the cabin upwards.

Accordingly, even though the nozzle type wing 120 is rotated angularly downward and hence the air flow passing through the nozzle type wing 120 is directed slightly downward, the upper and lower transverse wings 140 and 150 as well as the single transverse wing 110 are disposed to be inclined upwards from the rear end portion toward the front end portion, which is the cabin side, to guide the direction of the air flow being discharged into the cabin upwards so that the direction of the air flow being discharged into the cabin can be finally directed to the upward direction (i.e., toward the face of the passenger).

As described above, in a state in which the condition that the upper and lower transverse wings 140 and 150 are concealed by the garnishes 180 when viewed from the outside and only the single transverse wing 110 is exposed to the outside, upward direction of the air flow being discharged into the cabin can be easily adjusted by the downward angular and rotational movement of the nozzle type wing 120 and the downward angular and rotational movement of the rear end portions of the upper and lower transverse wings 140 and 150.

FIG. 7 is a cross-section view showing an operation state of a slim type air vent apparatus for an automotive vehicle according to an exemplary embodiment of the present invention.

Operation of Discharging Air Flow Downward into a Cabin

First, when a user holds the knob 114 mounted to the single transverse wing 110 and rotates angularly the single transverse wing 110 upwards, the rear end portion of the single transverse wing 110 rotates angularly upwards about the first hinge pins 112.

Accordingly, as shown in FIG. 8, the single transverse wing 110 is disposed to be inclined downward from the rear end portion toward the front end portion.

Then, the driving gears 116 of the single transverse wing 110 also rotate angularly to transmit angular and rotational force to the driven gears 129 and subsequently the nozzle type wing 120 is rotated angularly upwards about the hinge end portions 128 by angular rotation of the driven gears 129, so that the direction in which the air flow passing through the nozzle type wing 120 is discharged into the cabin is adjusted slightly upwards as can be seen in FIG. 8.

At the present time, since the upper and lower transverse wings 140 and 150 as well as the single transverse wing 110 are connected as one by the vertical link 160 for converting direction as described above, the vertical link 160 for converting direction moves linearly upwards when the single transverse wing 110 rotates angularly upwards.

Subsequently, the rear end portion of the upper transverse wing 140 is rotated angularly upwards about the second hinge pins 142 at the front end portion and the rear end portion of the lower transverse wing 150 is also rotated angularly upwards about the third hinge pins 152 at the front end portion by upward linear movement of the vertical link 160 for converting direction, with the result that the upper and lower transverse wings 140 and 150 together with the single transverse wing 110 are disposed to be inclined downward from the rear end portion toward the front end portion which is the cabin side to guide direction of the air flow being discharged into the cabin downward.

Accordingly, even though the nozzle type wing 120 is rotated angularly upwards and hence the air flow passing through the nozzle type wing 120 is directed slightly upwards, the upper and lower transverse wings 140 and 150 as well as the single transverse wing 110 are disposed to be inclined downward from the rear end portion toward the front end portion, which is the cabin side, to guide the direction of the air flow being discharged into the cabin downward so that the direction of the air flow being discharged into the cabin can be finally directed to the downward direction (i.e., toward the belly button of the passenger).

As described above, in a state in which the condition that the upper and lower transverse wings 140 and 150 are concealed by the garnishes 180 when viewed externally and only the single transverse wing 110 is exposed to the outside, downward direction of the air flow being discharged into the cabin can be easily adjusted by the upward angular and rotational movement of the nozzle type wing 120 and the upward angular and rotational movement of the rear end portions of the upper and lower transverse wings 140 and 150.

On the other hand, although the vertical wings 130 do not rotate angularly left and right in a state condition that they are disposed linearly along a front and rear direction inside the nozzle type wing 120, they impart straightness to the air flow being discharged into the cabin through the nozzle type wing 120 so that straightness of the air flow is ensured when the air flow is discharged into the cabin upwards or downwards.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for adjusting direction of air flow of a slim type air vent for an automotive vehicle, the apparatus comprising:
   a single transverse wing mounted to an outlet of a slim air duct in a manner of rotating angularly upwards or downwards to guide direction of air flow being discharged into a cabin upwards or downwards;
   driving gears integrally formed on opposite end portions of a back surface of the single transverse wing;
   a nozzle mounted inside the slim air duct in a manner of rotating angularly upwards or downwards to guide the direction of the air flow being discharged into the cabin upwards or downwards; and
   driven gears formed on front surfaces of first and second end portions of the nozzle to engage with the driving gears,
   wherein hinge end portions hinged to an internal wall surface of the slim air duct are integrally formed as a center point of angular rotation of the nozzle at front end portions of first and second side plates of the nozzle and the driven gears are integrally formed on front surfaces of the hinge end portions.

2. The apparatus of claim 1, wherein the nozzle is formed in a rectangular frame shape in which a top plate inclined downwards and a bottom plate inclined toward the cabin respectively are integrally connected by the first and second side plates.

3. The apparatus of claim 1, wherein a plurality of vertical wings for guiding straight flow of air flow are disposed at a constant interval in the nozzle.

4. The apparatus of claim 1, wherein the driving gears of the single transverse wing are formed in an arched arcuate cross-sectional structure and the driven gears of the nozzle are formed in a semicircular cross-sectional structure.

5. The apparatus of claim 1, wherein first hinge pins hinged to the internal wall surface of the outlet of the slim air duct are integrally formed as a center point of angular rotation of the single transverse wing at front positions of a first side and a second side of the single transverse wing.

6. The apparatus of claim 1, wherein upper and lower transverse wings for guiding upward and downward discharging direction of air flow are further disposed in a manner of rotating angularly at upper and lower position from the single transverse wing respectively, the upper position and the lower position being spaced apart from the single transverse wing each other.

7. The apparatus of claim 6, wherein second and third hinge pins which are hinged to the internal wall surface of the outlet of the slim air duct are integrally formed at front positions of a first side and a second side of the upper and lower transverse wings respectively.

8. The apparatus of claim 1, wherein guide pins are formed integrally at rear positions of the first side and the second side of the single transverse wing and rear positions of the first side and the second side of upper and lower transverse wings and wherein each guide pin is hinged to a vertical link for converting direction.

9. The apparatus of claim 8, wherein the vertical link for converting direction is provided as a straight link in which engaging grooves to which the guide pins are hinged are formed vertically and equidistantly to force the upper and lower transverse wings to rotate angularly in the same direction while the vertical link for converting direction moves linearly in an upward or downward direction when the single transverse wing rotates angularly in the upward or downward direction.

10. An apparatus for adjusting direction of air flow of a slim type air vent for an automotive vehicle, the apparatus comprising:
- a single transverse wing mounted to an outlet of a slim air duct in a manner of rotating angularly upwards or downwards to guide direction of air flow being discharged into a cabin upwards or downwards;
- driving gears integrally formed on opposite end portions of a back surface of the single transverse wing,
- a nozzle mounted inside the slim air duct in a manner of rotating angularly upwards or downwards to guide the direction of the air flow being discharged into the cabin upwards or downwards; and
- driven gears formed on front surfaces of first and second end portions of the nozzle to engage with the driving gears,
- wherein hinge end portions hinged to an internal wall surface of the slim air duct are integrally formed with first and second side plates of the nozzle as a center point of angular rotation of the nozzle at front end portions of the first and second side plates and the driven gears are integrally formed on front surfaces of the hinge end portions, and
- wherein upper and lower transverse wings for guiding upward and downward discharging direction of air flow are further disposed in a manner of rotating angularly at upper and lower positions from the single transverse wing respectively, the upper position and the lower position being spaced apart from the single transverse wing each other.

* * * * *